DANIEL J. NEWMAN
JOHN S. NEGRA
STEPHEN J. SAWYER
INVENTORS.

BY
AGENT

DANIEL J. NEWMAN
JOHN S. NEGRA
STEPHEN J. SAWYER
INVENTORS.

DANIEL J. NEWMAN
JOHN S. NEGRA
STEPHEN J. SAWYER
INVENTORS.

United States Patent Office 3,542,510
Patented Nov. 24, 1970

3,542,510
PRODUCTION OF HIGHLY CONCENTRATED
NITRIC ACID
Daniel J. Newman, Jackson Heights, N.Y., and John S.
Negra, South Plainfield, and Stephen J. Sawyer, Fords,
N.J., assignors to Chemical Construction Corporation,
New York, N.Y., a corporation of Delaware
Filed Mar. 14, 1968, Ser. No. 713,058
Int. Cl. C01b 21/40
U.S. Cl. 23—160                                    11 Claims

ABSTRACT OF THE DISCLOSURE

Highly concentrated nitric acid having a nitric acid content higher than the 68% nitric acid content of the water-nitric acid azeotrope is produced by cooling a process gas stream containing nitrogen oxides and water vapor, to selectively condense a liquid phase consisting essentially of nitric acid and nitrogen oxides. The process gas stream is, for example, derived as a portion of the main process gas stream passing to the nitrogen oxides absorber in a conventional nitric acid production facility. The condensed liquid phase is contacted with a small amount of air to yield a gaseous mixture with a high concentration of nitrogen oxides. After providing sufficient time to complete oxidation of the nitric oxides, the resulting gas mixture is contacted with liquid nitric acid of a lower strength generally in the range of 50% to 65% nitric acid content. Product concentrated nitric acid solution containing in the range of about 70% to 99% nitric acid content is removed from the bottom of the contact zone.

BACKGROUND OF THE INVENTION

Field of the invention

Figure 1:
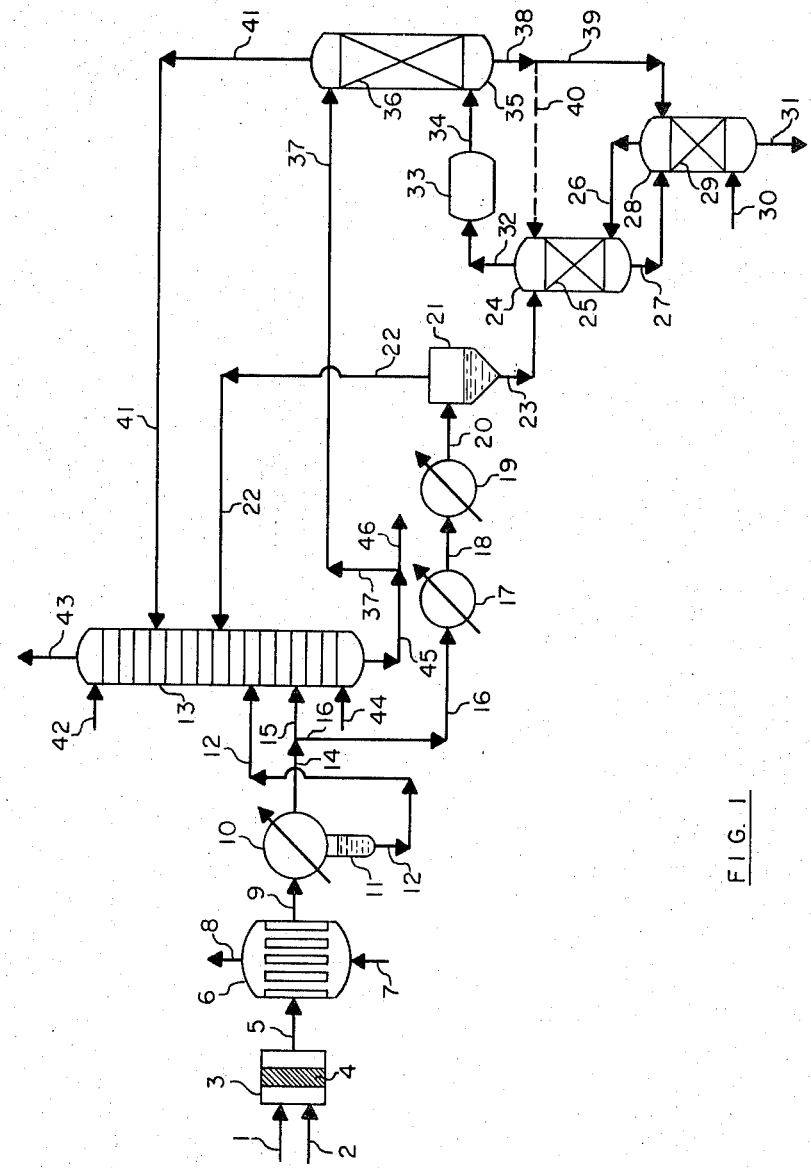

The invention relates ot the production of highly concentrated nitric acid from a gas stream containing nitrogen oxides and water vapor, which is usually produced by the catalytic oxidation of ammonia vapor with air. The concentrated nitric acid produced by the present invention is usually an aqueous nitric acid solution containing more than 68% nitric acid content by weight, however substantially anhydrous nitric acid consisting essentially of 100% nitric acid may be produced in accordance with the concepts of the invention.

Description of the prior art

The conventional processes for the production of nitric acid by the absorption of nitrogen oxides in aqueous solution can produce an aqueous nitric acid product having a nitric acid content up to about 68% by weight. In most instances, commercial facilities produce a product aqueous nitric acid solution containing in the range of about 50% to 65% nitric acid content by weight.

There are two types of procedures which are commercially employed for the production of highly concentrated nitric acid from aqueous acid of a strength lower than 68% nitric acid content. In one procedure, such as described in U.S. Pat. No. 2,860,035, a dehydrating agent such as magnesium nitrate or sulfuric acid is mixed with the aqueous nitric acid solution. The resulting mixture may then be distilled to produce highly concentrated nitric acid, since the dehydrating agent selectively absorbs or combines with the water and concentrated nitric acid vapor is evolved on heating the mixture. The residual aqueous solution is then separately distilled or steam stripped to drive off water vapor and regenerate the dehydrating agent. Such procedures involving the alternative dilution and re-concentration of a dehydrating agent require large amounts of steam or other heat sources, and large and expensive apparatus units which must be constructed of corrosion-resistant materials. In addition, the use of a dehydrating agent introduces an extraneous chemical agent into the nitric acid system.

Another sequence for producing highly concentrated nitric acid, as described lin Hydrocarbon Processing, vol. 45, No. 11, issue for November 1966 at pp. 182–188, uses ammonia which is reacted with either air or pure oxygen and converted to nitrogen dioxide which is then liquefied. The resulting liquid oxide of nitrogen, generally termed nitrogen tetroxide, is then converted in an autoclave with oxygen and water or dilute acid under pressure to produce practically water-free nitric acid. This procedure is objectionable because of the necessity for the provision of a high operating pressure, and an expensive high pressure autoclave and appurtenances thereto.

Other procedures for producing highly concentrated nitric acid are described in Chem. Techn., issue for May 1967, at pp. 278–282, and British Chemical Engineering Process Supplement, November 1967, pp. 57–58. The fractional condensation of nitrogen tetroxide is described in U.S. Pat. No. 3,102,788.

SUMMARY OF THE INVENTION

The present invention is typically constituted as an addition to an existing nitric acid plant, in which ammonia is catalytically oxidized with air to form a hot process gas stream containing nitrogen oxides and water vapor, the process gas stream is cooled to condense weak nitric acid, and the residual process gas stream is passed to an absorption tower or zone for oxidation of nitric oxide, absorption of nitrogen dioxide, and formation of aqueous nitric acid solution. The maximum concentration of product acid formed is a function of the concentrations of nitrogen oxides in the gas to the tower and the operating pressure. A typical plant operating at about 7 kg./sq. cm. will feed gas to the tower at about 7% nitrogen oxides content yielding a product acid at about 60% nitric acid content. In the present invention, part of the residual process gas stream leaving the weak acid condenser is separated from the main stream and further cooled with refrigerant ot condense out a significant quantity of nitrogen oxides and strong nitric acid, with the uncondensed gas being returned to the main absorber. An air stream in proportion to yield sufficient oxygen to convert the oxides to acid plus some excess is used to strip the oxides from the acid, yielding a much higher concentration of oxides in the resultant strong gas than the 7% to 10% by volume in the feed gas to standard absorption towers. After oxidation of much of the nitric oxide to nitrogen dioxide, this resultant gas can reach equilibrium with nitric acid of appreciably higher concentration than the 50% to 68% acid which is the limitation of acid strength produced in standard facilities. Therefore, when the resultant gas is contacted with 50% to 65% nitric acid solution in an absorption zone, it will yield highly concentrated acid solution containing some dissolved oxides of ntrogen. The latter product can be passed to a bleaching zone to be first contacted with the air stream mentioned supra, in order to remove the dissolved oxides, which are thus recycled to the absorption zone.

With respect to the relative quantity of high concentration acid produced by the process, the split between the amounts of more dilute acid produced in the standard absorption facility and the high concentration acid depends on the relative concentrations to be produced. If all product is desired at high concentration, about 72% acid by weight is the maximum that can be reached without separate removal of water. For 75% acid, at least 20% of the product must be produced as about 60% acid. For 90% concentration, the side stream would have to be at least 50% of the production. These product splits are determined by the water balance, and are independent of pressure, assuming that no water is separately removed from the process. It should be noted that for split pressure nitric acid plants, where ammonia oxidation takes place at atmospheric pressure, rapid cooling separates water with only traces of nitric acid, which can be discarded. In such plants, an appreciably higher percentage of the acid can be produced at a higher concentration.

The maximum concentration of the product acid will be a function of the operating pressure. Based upon laboratory tests, an 80% strength end product can be reached at the typical 8 kg./sq. cm. operating pressure of a standard nitric acid facility. Higher pressures would yield higher nitrogen oxides concentrations and stronger product acid.

Although the invention has been described supra as an addition to an existing plant, the invention may also be employed as a unitary process in a completely new plant facility, designed to yield only the higher concentration product. In addition, the additional absorption and enriching tower, stripper and bleacher described as separate units and operations can be combined into a single unit.

As mentioned supra, higher maximum concentration may be obtained by operating at more elevated pressure. In some instances of applying the invention to an existing nitric acid facility, the concentrating and absorption unit or tower is operated at substantially the same pressure as the nitric acid plant, using air from the main air compressor and allowing fluids to move by gravity. However, by providing a separate air compressor or booster and liquid pumps for the weak acid and condensate streams, the tower can be operated at substantially higher pressures, thus shifting the equilibrium so that 100% acid concentration can be reached.

In ammonia oxidation plants for nitric acid production, one mole of water remains for every mole of acid produced, due to the stoichiometric balance in ammonia oxidation. In order to make more of the product at higher concentrations, it is necessary to remove water from the system. One method of water removal within the scope of the present invention is by atmospheric distillation of the weak acid produced in the weak acid condenser by the initial cooling of the process gas stream derived from catalytic ammonia combustion. Since the concentration of the weak acid is below the azeotrope, water can be removed overhead leaving 68% acid, which is passed to the absorption zone in which the highly concentrated acid is produced. In an 8 kg./sq. cm. pressure plant system with a high pressure concentrating tower, removal of water by distillation of the weak acid will permit all product acid to be produced at about 80% concentration. In this alternative, about 70% of the total acid production can be at 100% acid strength or concentration, with the balance at about 60% concentration. In another alternative within the scope of the invention, the highly concentrated acid of typically 75% to 80% strength formed in the absorption zone in accordance with the basic invention may be distilled, to produce a 100% acid overhead and 68% azeotrope acid bottoms which is recycled. This alternative would obviate the requirement of higher operating pressure for higher concentrations, and in addition varying acid strengths up to 100% concentration may be produced by this sequence, by varying operating conditions such as temperature and reflux ratio in the distillation of the highly concentrated 75% to 80% acid.

The principal advantage of the invention is that highly concentrated nitric acid having a nitric acid content above 68% and up to about 100% is produced in an efficient and economical manner. Another advantage is that the objectionable aspects of prior art processes, such as high corrosion rates, use of extraneous materials such as dehydrating agents or pure oxygen, and the provision of large and expensive apparatus for operation at high pressure, have now been obviated. A further advantage is that the entire acid output of the facility may consist of highly concentrated nitric acid, without the concomitant production of a more dilute acid product having an acid content less than 68% by weight.

It is an object of the present invention to provide an improved process for the production of highly concentrated nitric acid of higher than 68% nitric acid content.

Another object is to provide an improved nitric acid process.

A further object is to provide a process for the production of highly concentrated nitric acid which may be applied to an existing nitric acid facility in which nitric acid product of less than 68% nitric acid content is produced.

An additional object is to provide a process for the production of nitric acid in which the entire output of the process is highly concentrated nitric acid of greater than 68% acid strength.

Still another object is to provide a process for the production of highly concentrated nitric acid which does not require the usage of a dehydrating agent or oxygen.

These and other objects and advantages of the present invention will become evident from the description which follows.

DESCRIPTION OF THE DRAWINGS AND PREFERRED EMBODIMENTS

Referring to the drawings, FIG. 1 is a flowsheet of one embodiment of the invention, illustrating in detail the novel combination of bleaching, stripping and absorption zones in which highly concentrated nitric acid is produced.

Figure 2:
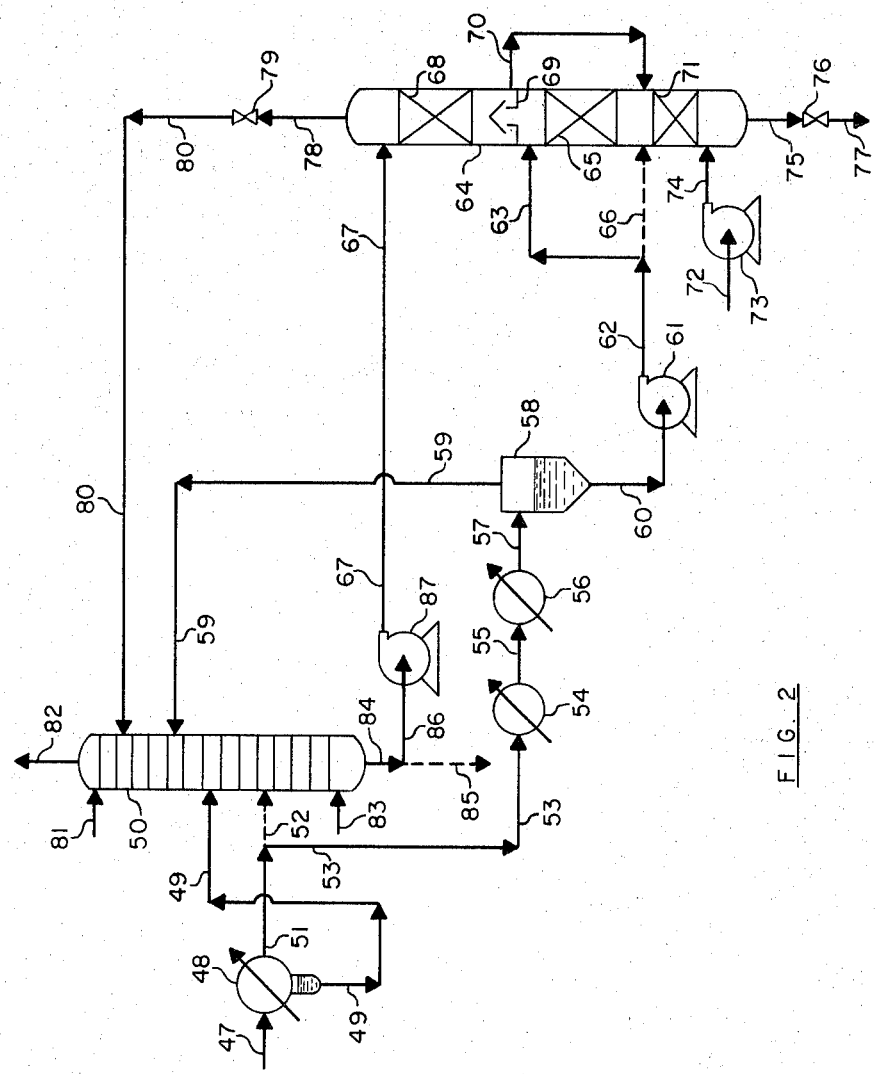
Figure 3:
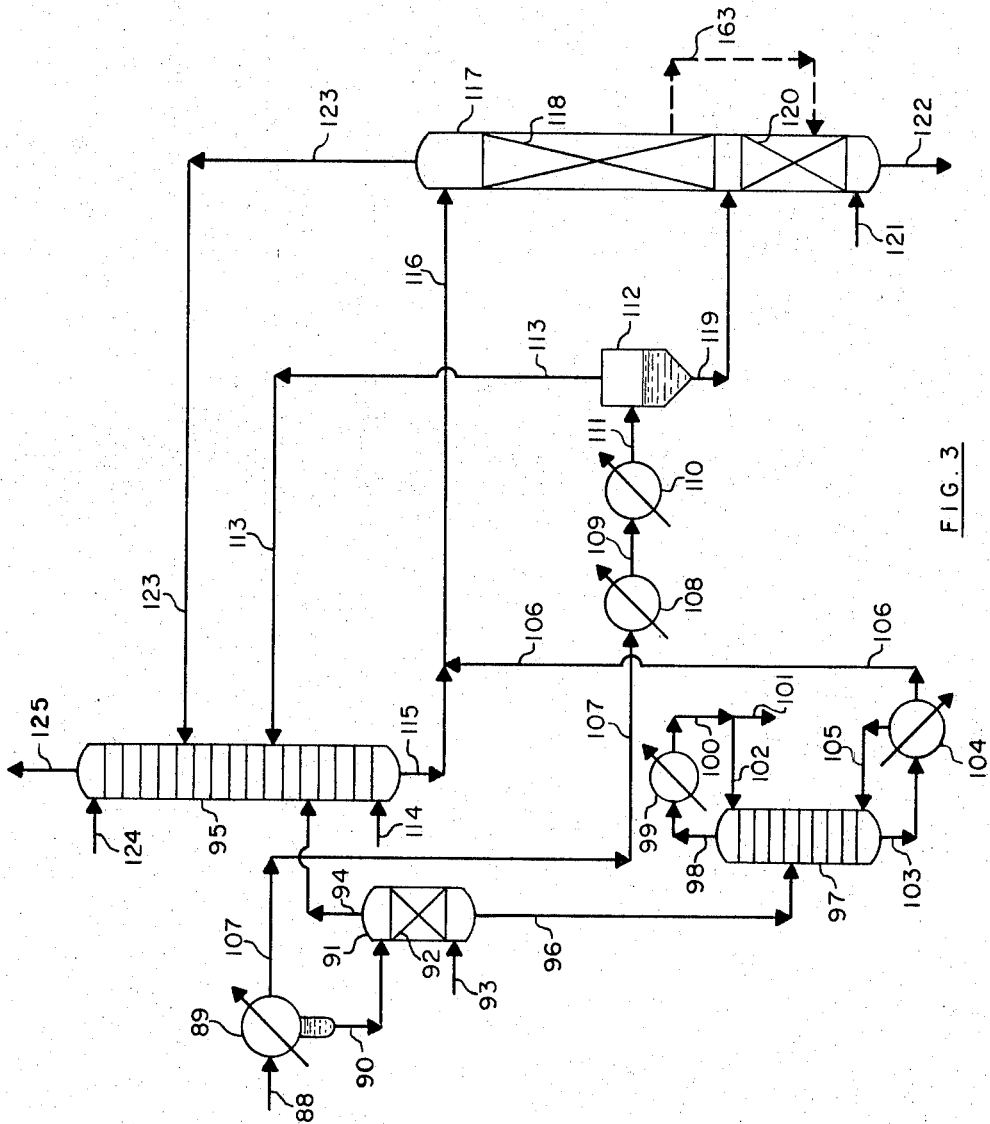
Figure 4:
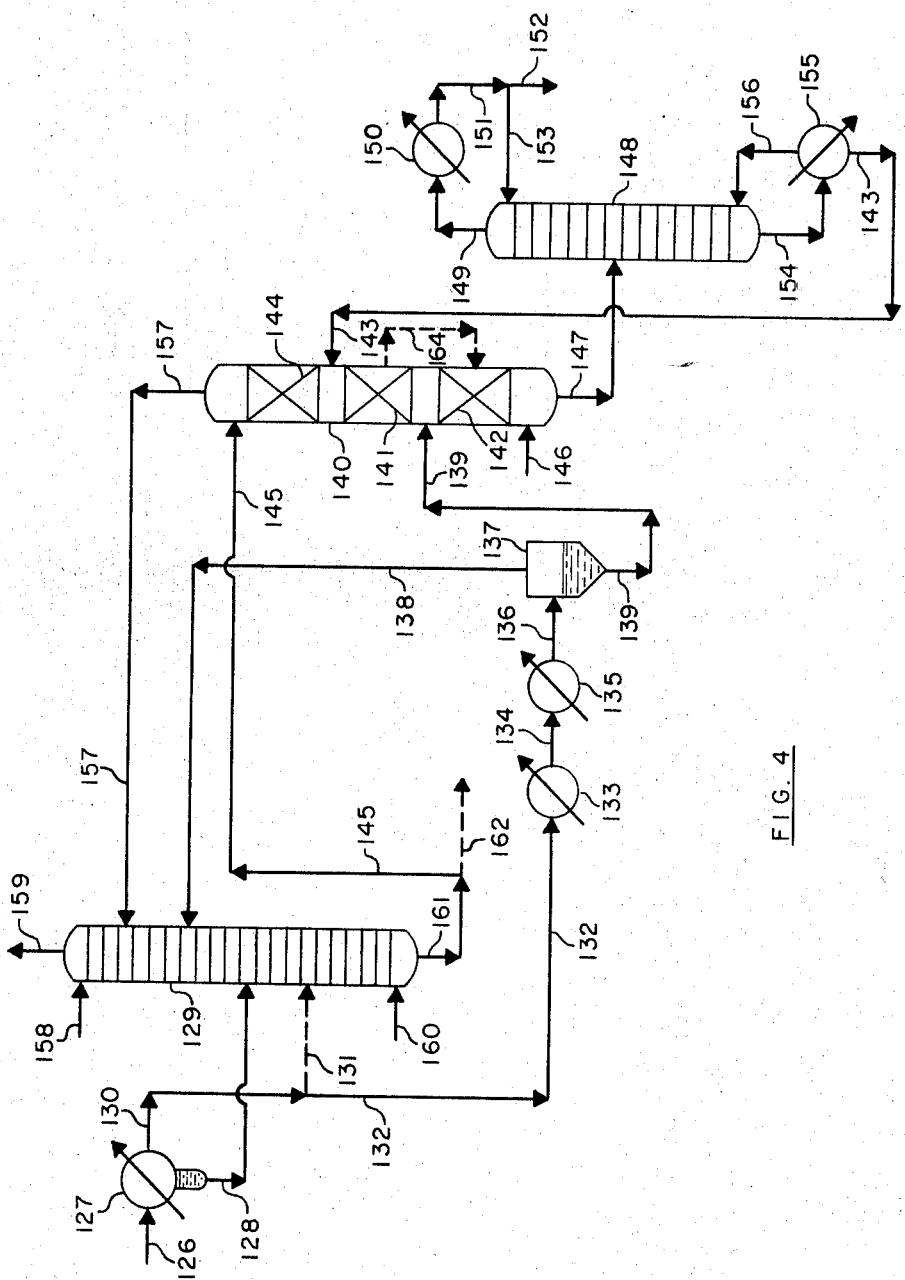

FIG. 2 is a flowsheet of an embodiment of the invention in which elevated pressure is employed to produce a more highly concentrated nitric acid, FIG. 3 is a flowsheet of an embodiment of the invention in which distillation is employed to eliminate water from the system, so that the output of the facility is more of or a more highly concentrated nitric acid, and FIG. 4 is a flowsheet of an embodiment of the invention in which distillation is employed to produce substantially 100% nitric acid product.

Referring now to FIG. 1, the initial process gas stream containing nitrogen oxides and water vapor is produced by the catalytic combustion of ammonia vapor with process air. Input ammonia vapor stream 1 and primary oxidation air stream 2 are passed into catalytic ammonia burner 3. After the gas streams 1 and 2 are mixed in the inlet section of burner 3, the mixed gas stream which usually contains about 10.5% ammonia vapor is ignited in catalyst section 4 and the ammonia is catalytically oxidized to nitrogen oxides and water vapor at a temperature in the range of about 700° C. to 1000° C. The nitrogen oxides will generally consist of a mixture of nitric oxide and nitrogen dioxide or combinations of these oxides, and the term nitrogen oxides will be understood to also encompass these oxides of nitrogen taken separately, or a mixture in any proportion. The catalyst 4 is usually a platinum or platinum-rhodium gauze type of catalyst. The hot gas stream is discharged from burner 3 via stream 5, which passes through waste heat boiler 6 in which cooling of the gas stream takes place. Boiler feed water stream 7 is passed to the tubes of boiler 6, and generated steam is removed via stream 8. The cooled process gas is discharged from boiler 6 via stream 9, which is at a temperature typically in the range of about 250° C. to 400° C. Stream 9 typically contains, in mol percent, about 10% total nitrogen oxides, 18% water vapor, 6% free oxygen, and balance inerts. The inerts consist mostly of nitrogen derived from the primary oxidation air stream 2. Stream 9 will usually be at an elevated pressure, typically in the range of 2 kg./sq. cm. to 10 kg./sq. cm., principally because at lower or atmospheric pressure, the size of equipment required to handle the larger gas volumes becomes prohibitive. A suitable and preferred operating pressure is about 8 kg./sq. cm., since above about 10 kg./sq. cm. the conversion efficiency in the catalytic ammonia oxidation of unit 3 tends to be lowered.

Stream 9 may be derived from other sources, such as the electric arc fixation of atmospheric nitrogen or as a byproduct off-gas stream from organic nitration processes or the like. In most instances, stream 9 will contain water vapor as well as nitrogen oxides, and stream 9 is passed into weak acid condenser 10 to remove excess water vapor as condensed liquid weak nitric acid by heat exchange with a suitable coolant, such as cooling water. The condensed weak or dilute aqueous nitric acid solution collects as a body of liquid solution in the lower portion 11 of condenser 10, and is withdrawn as stream 12 which is passed into the middle section of nitrogen oxides absorption tower 13. Unit 13 will be an existing absorber when the invention is applied to an existing nitric acid production facility. In any case, unit 13 will generally consist of a vertically oriented absorption zone such as a tower provided with a plurality of horizontal bubble cap plates or sieve trays and internal cooling coils, and unit 13 serves to absorb nitrogen oxides in aqueous solution and form concentrated nitric acid of a nitric acid content below about 70% by weight. In the process description and claims infra, reference to the percent strength of concentration of aqueous nitric acid solution will refer to the nitric acid content in percent by weight.

A cooled process gas stream 14 is removed from unit 10, and stream 14 is of diminished water vapor content and is typically at a temperature in the range of about 40° C. to 80° C. Stream 14 may be derived from other external sources in some cases, instead of from unit 10. These external sources may consist of other processes such as the electric arc fixation of atmospheric nitrogen or nitration processes. In this case, units 3, 6 and 10 would be omitted. A portion of stream 14 is usually passed into unit 13 via stream 15, in order to provide adequate nitrogen oxides content in the absorption tower 13 for the production of a suitably concentrated aqueous nitric acid product. In conventional practice in nitric acid production, all of stream 14 is passed into unit 13. In accordance with the concepts of the present invention, all or a portion of stream 14 is passed via stream 16 to cooling for condensation of a nitrogen oxides-rich concentrated liquid nitric acid stream. Stream 16 is initially passed through gas cooler 17, which is typically an indirect heat exchanger through which cooling water is circulated, to provide initial reduction in the temperature of the process gas stream. The resulting cooled process gas stream 18 discharged from unit 17 is passed through refrigerated cooler 19 for further cooling of the process gas stream by indirect heat exchange with a suitable coolant which is usually a refrigerant such as brine, freon or liquid ammonia. The fully cooled process stream 20 discharged from unit 19 is now at a reduced temperature typically in the range of about −40° C. to 15° C., and contains a condensed liquid phase consisting of concentrated nitric acid containing dissolved nitrogen oxides. Stream 20 is usually at a temperature between 0° C. and minus 25° C. (−25° C.). Stream 20 is passed into gas-liquid separator 21, which is a cyclonic, baffled, or other conventional type of unit for the separation of an entrained liquid phase from a gas stream. The liquid-free cold gas phase stream 22 which is withdrawn from unit 21 now contains a small residual proportion of nitrogen oxides, and stream 22 may be passed in heat exchange with strea m18 in a heat exchanger, not shown, before being passed to unit 13 for the recovery of residual nitrogen oxides content as nitric acid.

The liquid phase stream 23 withdrawn from unit 21 is now processed in accordance with the present invention to produce highly concentrated nitric acid. Stream 23 is passed into a stripping zone consisting of tower 24 above section 25, and the liquid flows downwards through section 25, which usually consists of a bed of suitable spherical, ring or saddle-type packing, or suitable trays such as sieve or bubble cap trays, for extended surface gas-liquid contact between liquid stream 23 ond stripping gas stream 26, which consists mostly of air together with a minor proportion of nitrogen oxides and which is admitted into unit 24 below bed 25. The rising gas phase within bed 25 serves to selectively strip most of the nitrogen oxides from the liquid phase, and the resulting liquid stream 27 removed from the bottom of unit 24 now consists essentially of highly concentrated nitric acid containing only a minor residual proportion of nitrogen oxides.

Stream 27 is now passed into bleaching tower 28 above section 29, which is generally similar in configuration to section 25 described supra. In addition, highly concentrated nitric acid stream 39, derived in a manner to be described infra, is also passed into unit 28 above section 29. A bleach air stream 30 is passed into unit 28 below section 29, and rises through section 29 countercurrent to the downflowing dispersed liquid phase, thus serving to strip and desorb residual nitrogen oxides from the liquid concentrated nitric acid, and thereby produce a clear, highly concentrated nitric acid product, which is removed from the bottom of unit 28 via stream 31. The product highly concentrated nitric acid stream 31 discharged from unit 28 typically contains in the range of about 70% to 99% nitric acid content, and is substantially free of nitrogen oxides.

Returning to unit 24, the rising gas phase containing nitrogen oxides stripped from the liquid phase is removed from unit 24 via stream 32, which is high in nitrogen oxides content and typically contains in the range of about 10% to 50% nitrogen oxides content by volume, together with free oxygen, water vapor and inerts such as nitrogen. Stream 32 is passed into oxidation residence chamber 33, in which the gas stream flows at reduced velocity for an extended residence time, in order to attain maximum oxidation of nitric oxide to nitrogen dioxide. The resulting process gas stream 34 discharged from chamber 33 is rich in nitrogen dioxide, and stream 34 is passed into an absorption and enriching zone consisting of tower 35 below section 36 in order to enrich the downflowing liquid nitric acid phase in section 36 with nitrogen dioxide and thereby form highly concentrated nitric acid. Section 36 is generally similar in configuration to section 25 described supra. The liquid phase in section 36 consists of stream 37, which is a concentrated aqueous nitric acid solution of generally in the ranges of 50% to 65% nitric acid content. Stream 37 is derived from within the process in a manner to be described infra, and stream 37 is passed into unit 35 above section 36.

The resulting liquid phase stream 38 discharged from the bottom of unit 35 consists essentially of a highly concentrated nitric acid solution, having a nitric acid content above 68% and up to about 99%. Stream 38 contains a minor proportion of dissolved nitrogen oxides, and consequently in most instances stream 38 will be passed via stream 39 to unit 28, for bleaching and removal of nitrogen oxides, in which case stream 39 will be a component of stream 31. In other instances, such as when stream 38 is relatively rich in dissolved oxides, all or a portion of stream 38 will be passed via stream 40 to unit 24.

Returning to unit 35, the residual overhead tail gas stream 41 contains a minor residual proportion of about 0.2% to 1% nitrogen oxides content, together with about 0.3% to 5% free oxygen, and a minor proportion of nitric acid mist and droplets, with the balance of stream 41 consisting of nitrogen together with a minor proportion of other inerts. Stream 41 is passed into the upper portion of tower 13, for the recovery of nitrogen oxides and nitric acid mist which are absorbed into the downflowing liquid phase within tower 13. A liquid stream 42 which generally consists of condensate water or very dilute nitric acid solution is passed into the top of tower 13, and a residual tail gas stream 43 containing only a very minor proportion of nitrogen oxides is discharged from the top of unit 13. A bleach air stream 44 is passed into the bottom of tower 13, and stream 44 serves to remove residual nitrogen oxides from the liquid phase in the lower portion of tower 13, and also to oxidize nitric oxide within tower 13 to nitrogen dioxide. Concentrated aqueous liquid nitric acid solution stream 45 is withdrawn from the bottom of unit 13. Stream 45 usually contains in the range of about 50% to 65% nitric acid content, and stream 45 is divided into product acid stream 46 and stream 37, which is passed to absorption and enriching tower 35 as described supra. The functions of vessels 24, 28, 33 and 35 can be incorporated into a single vessel, as will appear infra.

Referring now to FIG. 2, an alternative embodiment of the invention is presented, in which elevated pressure is employed to produce a more highly concentrated nitric acid. The provision of a more highly elevated pressure during the processing which leads to the production of highly concentrated nitric acid is highly advantageous, since a more highly elevated pressure shifts the equilibrium between nitric acid, nitrogen oxides and water, and therefore leads to the direct production of nitric acid of a strength up to 100% acid content. The portions of the procedural sequence of FIG. 2 which are similar to FIG. 1, will only be briefly described. Process gas stream 47 is typically derived in a manner similar to stream 9 described supra, and stream 47 contains nitrogen oxides and water vapor. In most instances, stream 47 is derived from catalytic ammonia combustion and also contains inerts such as nitrogen, and excess free oxygen. Stream 47 is passed to weak acid condenser 48, in which dilute aqueous nitric acid solution is condensed from the process gas stream by heat exchange with cooling water or other suitable fluid. The condensed weak or dilute nitric acid stream 49 is passed to absorber 50, which is a vertically oriented absorption zone usually consisting of a tower provided with a plurality of horizontal bubble cap or sieve trays or the like.

The resultant process gas stream 51 discharged from unit 48 is of reduced water vapor content. Stream 51 is usually divided into stream 52, which is passed into unit 50, and stream 53, which is utilized in accordance with the present invention. In some instances stream 52 may be omitted, with all of stream 51 passing to further processing via stream 53. In any case, stream 53 is passed to water-cooled heat exchanger 54, and the resultant cooled process stream 55 is passed through refrigerated cooler-condenser 56, for condensation of highly concentrated liquid nitric acid containing a high nitrogen oxides content. The fully cooled process stream 57 discharged from unit 56 now contains gaseous and condensed liquid phases, and stream 57 is passed to gas-liquid separator 58. The separated gaseous phase stream 59 is passed to the tower 50 for the recovery of residual nitrogen oxides content, while the liquid phase withdrawn from unit 58 via stream 60 is utilized in accordance with the present invention.

Stream 60 is initially compressed to an elevated pressure, by passing or drawing stream 60 into pump 61. The resulting pressurized liquid stream 62 discharged from pump 61, now at an elevated pressure typically in the range of 3 kg./sq. cm. to 100 kg./sq. cm., is preferably passed via stream 63 into high pressure tower 64 above the middle stripping zone or section 65. In some cases, all or a portion of stream 62 may be passed into tower 64 below section 65 via stream 66. The section 65 will generally consist of a bed of spherical, ring or saddle packing, supported on a fluid-permeable grid, or a series of sieve or bubble cap trays. A pressurized concentrated nitric acid stream 67, which has a nitric acid content below the 68% azeotrope and is at a pressure in the range of 3 kg./sq. cm. to 100 kg./sq. cm., is passed into tower 64 above the packed absorption section 68, which is similar in configuration to section 65, and in which the absorption of nitrogen oxides into the liquid phase takes place, with the resultant formation of highly concentrated liquid nitric acid in section 68. The highly concentrated liquid nitric acid flowing downwards from packing bed 68 is preferably retained on partition 69, which retains downflowing liquid while permitting upward flow of the rising gas phase rich in nitrogen oxides which is discharged upwards from bed 65. The collected liquid is withdrawn from partition 69 via stream 70, which bypasses bed 65 and passes the highly concentrated nitric acid directly into the upper part of bleaching zone or section 71 within the lower part of tower 64. Section 71 is a packed bed or series of trays similar to bed 65 described supra.

Bleach air stream 72 is compressed by blower or compressor 73 to an elevated pressure, and the resulting compressed air stream 74 discharged from unit 73 at a pressure in the range of 3 kg./sq. cm. to 100 kg./sq. cm. is passed into unit 64 below section 71. The bleach air stream 74 rises through section 71, and thereby removes residual nitrogen oxides from the downflowing highly concentrated nitric acid, in order to produce a clear product. The product liquid nitric acid collects in the bottom of unit 64 below section 71, and is removed via stream 75, which passes through pressure reducing valve 76, and is discharged to product utilization via stream 77. The product nitric acid stream 77 consists of a highly concentrated product, which has a nitric acid content above 68% and up to about 100%. In most instances, the nitric acid content of stream 77 will be in the range of about 70% to 99%.

The bleach air containing a minor proportion of nitrogen oxides rises from section 71 within unit 64, and flows upwards through section 65, thereby stripping nitrogen oxides from the liquid phase in section 65. The resulting gas phase discharged upwards from section 65, now rich in nitrogen oxides, flows upwards through partition 69 and then passes upwards through absorption zone or section 68, and thereby enriches the downflowing liquid phase in section 68 with nitrogen oxides, so that highly concentrated liquid nitric acid is formed and most of the nitrogen oxides are removed from the gas phase. The residual gas phase discharged upwards from section 68 is removed from the top of tower 64 via stream 78, which consists mostly of nitrogen together with minor proportions of nitrogen oxides, nitric acid mist, free oxygen and water vapor. Stream 78 is passed through pressure reducing valve 79, and the resulting reduced pressure gas stream 80 is passed into absorption tower 50 for the recovery of residual nitrogen oxides and nitric acid mist as dissolved nitric acid in liquid solution.

Referring now to tower 50, liquid stream 81, which generally consists of condensate water or very dilute aqueous nitric acid solution, is passed into the upper portion of tower 50. A residual tail gas stream 82, which is now substantially free of nitrogen oxides and nitric acid, is discharged from the top of unit 50. A bleach air stream 83 is admitted into the lower part of tower 50, and concentrated nitric acid stream 84 having an acid strength in the range of about 50% to 65% is removed from the bottom of tower 50. Stream 84 is usually divided into product acid stream 85 which is passed to product utilization, and stream 86 which is utilized to produce highly concentrated nitric acid in accordance with the present invention. Stream 86 is pressurized in pump 87, and the high pressure nitric acid stream 67 discharged from pump 87 at a pressure in the range of 3 kg./sq. cm. to 100 kg./sq. cm. is utilized as described supra.

Referring now to FIG. 3, an embodiment of the invention is presented, in which distillation of the weak nitric acid solution produced by the initial cooling of the process gas stream serves to eliminate water from the system, so that the entire output of the facility is highly concentrated nitric acid. The initial process gas stream 88 contains nitrogen oxides and water vapor, and usually also contains free oxygen and inerts such as nitrogen. Stream 88 may be derived from the catalytic oxidation of ammonia vapor with air, electric arc fixation of atmospheric nitrogen, as an off-gas from organic nitrations, or the like. Stream 88 is passed into heat exchanger-condenser 89, and a condensed liquid phase is formed by the cooling of the gas stream. The condensed liquid phase consisting of weak or dilute nitric acid, usually containing in the range of about 10% to 50% nitric acid content, is removed from unit 89 via stream 90, which is passed into bleaching tower 91 above packed section 92. A bleach air stream 93 is passed into unit 91 below bed 92, and rises in bed 92 countercurrent to the downflowing liquid phase, so that nitrogen oxides are removed from the liquid phase and clear liquid nitric acid is produced. The resulting bleach air containing entrained nitrogen oxides is removed from the top of tower 91 via stream 94, which is passed into an absorption zone or tower 95 for the absorption of nitrogen oxides and formation of nitric acid.

The bleached dilute nitric acid solution formed in section 92 is removed from the bottom of unit 91 via stream 96, which is passed into the middle section of distillation column 97 for the selective removal of water from the system and production of a concentrated nitric acid stream for further utilization in the process. Column 97 is a distillation zone or unit which is provided with a plurality of bubble cap plates, sieve trays, valve trays or the like, or with a bed of packing, and which produces a separation of an overhead water vapor phase stream 98 from the aqueous nitric acid bottoms of enriched nitric acid content. The overhead vapor stream 98 is cooled and condensed in condenser 99, and the resulting liquid stream 100 is divided into waste stream 101 which is essentially liquid water and is discharged to sewer or other disposal, and reflux stream 102 which is recycled to the top plate of unit 97. A liquid bottoms stream 103 is removed from the bottom of unit 97. Stream 103 consists of concentrated aqueous nitric acid solution, and stream 103 is passed to distillation reboiler 104, which is heated by steam or other heating medium. A vaporized mixture of nitric acid and water is recycled from reboiler unit 104 to column 97 via stream 105, which provides the temperature driving force for the distillation process. A residual liquid phase is removed from unit 104 via stream 106, which consists of concentrated aqueous nitric acid solution having a nitric acid content in the range of about 50% to 68% by weight. Stream 106 is utilized in the production of highly concentrated nitric acid according to the concepts of the present invention, as will appear infra.

Returning to condenser 89, the residual uncondensed gas phase is removed via stream 107, which is passed into cooler 108 for further cooling by indirect heat exchange with cooling water. The further cooled process stream 109 discharged from unit 108 is passed into refrigerated cooler 110 for final cooling and condensation of a liquid phase by heat exchange with a suitable refrigerant such as brine, Freon or ammonia. The resulting process stream 111 discharged from unit 110 is now at a reduced temperature typically in the range of about −40° C. to 15° C., and contains a condensed liquid phase consisting of concentrated nitric acid containing dissolved nitrogen oxides. Stream 111 is passed into gas-liquid separator 112, which is a cyclonic, baffled, or other conventional type of unit for the separation of an entrained liquid phase from a gas stream. The liquid-free cold gas phase stream 113 which is withdrawn from unit 112 now contains a small residual proportion of nitrogen oxides, and stream 113 is passed to absorption zone 95 for the recovery of residual nitrogen oxides content as nitric acid.

The absorption unit 95 is operated in a manner similar to units 13 and 50 described supra, and tower 95 may in some cases consist of a process unit in an existing nitric acid process facility, which is to be converted to the production of highly concentrated nitric acid. A bleach air stream 114 is passed into the lower portion of tower 95, and a liquid stream 115 consisting of bleached concentrated nitric acid having an acid strength typically in the range of about 50% to 65% is removed from the bottom of unit 95. Stream 115 is combined with stream 106, and the resulting combined concentrated nitric acid stream 116 is passed into tower 117, in which a highly concentrated nitric acid product is formed. A portion or all of stream 115 may alternatively be passed to the upper portion of unit 91 or the lower portion of unit 97, in order to remove additional water from the system. Stream 116 is passed into unit 117 above packed section 118, and flows downwards through section 118 in extended surface contact with a rising gas phase rich in nitrogen oxides, so that the liquid phase in section 118 becomes enriched in nitrogen oxides and nitric acid. Section or zone 118 will usually consist of a bed of suitable packing, such as spheres, rings or saddles, or a plurality of trays.

Returning to gas-liquid separator 112, the liquid phase consisting of highly concentrated nitric acid plus dissolved nitrogen oxides is removed from unit 112 via stream 119, which is passed into unit 117 between upper packed section 118 and lower packed section 120. A bleach air stream 121 is passed into the lower part of unit 117 below bed 120, which is generally similar in configuration to bed 118 described supra. The rising air stream flows upward through bed 120 and bleaches the strips the downflowing highly concentrated nitric acid, so that a clear product acid stream 122 containing in the range of about 70% to 99% nitric acid content is removed from the bottom of unit 117. In this embodiment of the invention, all of the product nitric acid is removed via stream 122, without the production of a more dilute acid stream as a co-product, since excess water is discharged from the system via stream 101. Alternatively, portions of stream 106 or stream 115 may be removed from the system and passed to external utilization as co-product.

A tail gas stream 123 is discharged from the top of tower 117. Stream 123 consists primarily of nitrogen, together with nitrogen oxides and nitric acid mist which must be recovered for process efficiency. In order to recover fixed nitrogen values, stream 123 is passed into absorption tower 95. Aqueous liquid stream 124 is passed into the upper part of tower 95. Stream 124 generally consists of condensate water or very dilute aqueous nitric acid solution, and the descending aqueous phase in tower 95 serves to absorb nitrogen oxides from streams 123, 113 and 94 and form concentrated nitric acid stream 115. A tail gas stream 125 consisting principally of nitrogen is discharged from the top of unit 95. Stream 125 is substantially free of nitrogen oxides and nitric acid.

Referring now to FIG. 4, a flowsheet of an alternative embodiment of the invention is presented, in which distillation of the highly concentrated nitric acid which is initially produced according to the invention, is employed to produce a more highly concentrated nitric acid product which may readily be produced with 100% nitric acid content. The initial process gas stream 126 contains nitrogen oxides and water vapor, together with inerts such as nitrogen and excess free oxygen, and is generally derived from the catalytic oxidation of ammonia vapor with air, as described supra. In other instances, stream 126 may be produced by the electric arc fixation of atmospheric nitrogen or as an off-gas from organic nitrations or the like. Stream 126 is passed into heat exchanger-condenser 127, which is generally a water-cooled condenser, and an aqueous condensate consisting of weak or dilute nitric acid collects in the bottom of unit 127. The condensate is removed from the lower part of unit 127 via liquid stream 128, which is passed into absorption zone or tower 129. The tower 129 may be an apparatus unit in an existing nitric acid facility. The residual uncondensed gas phase is removed from unit 127 via process gas stream 130, which is utilized in accordance with the present invention. In most instances, a portion of stream 130 may be passed via stream 131 into tower 129, with the balance of stream 130 passing via stream 132 to utilization in accordance with the present invention. Stream 132 is passed to water-cooled heat exchanger 133, and the resulting further cooled process stream 134 is passed to refrigerated cooler-condenser 135 for final cooling by heat exchange with a suitable refrigerant such as brine, Freon or ammonia, with concomitant condensation of a liquid phase containing concentrated nitric acid and dissolved nitrogen oxides. The resulting mixed gas-liquid separator 137, and the residual uncondensed gaseous phase stream 138 is passed from unit 137 to absorption tower 129 for the recovery of residual nitrogen oxides as nitric acid.

The condensed liquid phase is withdrawn from unit 137 as liquid stream 139, which is passed into absorption and enriching tower 140 for the production of highly concentrated nitric acid. Tower 140 is provided with beds of packing consisting of spheres, rings, saddles or the like, supported on suitable fluid-permeable grids, or a plurality of trays. Stream 139 is passed into unit 140 between bed or zone 141 and lower bed or zone 142, and flows downwards through bed 142. A recycle concentrated liquid nitric acid stream 143, containing at least 68% nitric acid content and derived in a manner to be described infra, is passed into tower 140 between upper bed or zone 144 and middle bed 141. A concentrated nitric acid solution stream 145 containing less than 68% nitric acid content, and derived from unit 129 as will appear infra, is dispersed into the upper part of unit 140 above bed 144. The downflowing liquid phases in beds 144, 141 and 142 flow countercurrent to a rising bleach air stream 146, which is admitted into the lower part of unit 140 below bed 142 and rises through tower 140. The rising air stream 146 bleaches the highly concentrated liquid nitric acid in bed 142, strips nitrogen oxides from the liquid acid in bed 141, and oxidizes and dissolves nitrogen oxides in the liquid phase in absorption bed 144. A clear concentrated liquid nitric acid stream 147 is withdrawn from the bottom of unit 140. Stream 147 usually contains in the range of about 75% to 85% nitric acid content, and in any case stream 147 contains more than the 68% azeotropic content of nitric acid and is suitable for usage in the production of a more highly concentrated acid product by distillation in accordance with the present invention.

Stream 147 is passed into the middle section of distillation zone or column 148, which is provided with a plurality of bubble cap plates, sieve trays or the like, and an overhead vapor stream 149 of highly enriched nitric acid content is removed from the top of unit 148. In most instances, stream 149 will consist of essentially 100% nitric acid, however stream 149 may in some cases contain up to about 10% by weight of water vapor, with the balance of stream 149 consisting of nitric acid. In all cases, stream 149 will contain a lower water content than stream 147. Stream 149 is passed through cooler-condenser 150, and the resulting highly concentrated liquid nitric acid stream 151 is divided into product nitric acid stream 152, which preferably consists of 100% nitric acid, and reflux liquid stream 153 which is recycled to the top of unit 148. An aqueous liquid nitric acid stream 154 is removed from the bottom of distillation tower 148, and in most cases stream 154 will consist of the 68% nitric acid azeotrope, or a nitric acid solution containing in the range of about 68% to 75% nitric acid content. In all cases, stream 154 will contain a higher water content than stream 147. Stream 154 is passed to reboiler 155, which is preferably heated by steam, and a vaporized component stream 156 is recycled to the bottom of unit 148 to provide a heating effect for distillation. The balance of stream 154 is removed from unit 155 as stream 143, which is recycled to unit 140 as described supra.

Returning to tower 140, a tail gas stream 157 containing a minor residual proportion of nitrogen oxides and nitric acid mist is removed from the top of unit 140 and passed to absorption tower 129 for the recovery of fixed nitrogen values. A liquid stream 158 consisting of water or very dilute aqueous nitric acid solution is passed into the top of unit 129 and, a final tail gas stream 159 is discharged from the top of unit 129. Stream 159 is substantially free of nitrogen oxides and nitric acid mist. A bleach air stream 160 is passed into the lower section of unit 129, and a concentrated aqueous liquid nitric acid stream 161 is removed from the bottom of tower 129. Stream 161 usually contains in the range of about 50% to 65% nitric acid content, and a portion of stream 161 passess to product utilization via stream 162. The balance of stream 161 is utilized in the production of highly concentrated nitric acid in accordance with the present invention, by passing to tower 140 as stream 145.

Numerous alternatives within the scope of the present invention, besides those mentioned supra, will occur to those skilled in the art. The ranges of process variables such as temperature, pressure and solution concentrations enumerated supra constitute perferred embodiments of the invention for optimum utilization of the process concepts of the invention, and the invention may be practiced outside of these ranges in suitable instances, with the exception of the limitations as to temperature and solution concentrations embodied in the claims.

In some instances, the feed process gas stream may be relatively low in water vapor content, and the weak acid condensers such as units 48, 89 or 127 may be omitted in such cases, with all or a portion of the process gas stream passing directly to cooling units for the condensation of the concentrated nitric acid rich in nitrogen oxides. In some cases, the main process gas stream may be passed directly to refrigerated cooling, and units 17, 54, 108 or 133 may be omitted. Various sequences of heat exchange between process streams may be practiced in order to provide heat economy and efficiency. As mentioned supra, cold gas stream 22 may be passed in indirect heat exchange with stream 18, by the provision of an auxiliary gas-to-gas heat exchanger, not shown, in order to provide auxiliary cooling of stream 18. Similarly, cold gas stream 59 may be passed in heat exchange with stream 55, the cold gas stream 113 may be passed in heat exchange with stream 109, and the cold gas stream 138 may be passed in heat exchange with stream 134. In addition, various bypass procedures similar to stream 70 of FIG. 2 may be provided in practice, with respect to FIGS. 3 and 4, as indicated by dashed optional flow line 163 relative to unit 117 of FIG. 3 and line 164 relative to unit 140 of FIG. 4. In some instances, depending on solution concentrations and relatvie process stream flows, the tail gas streams 41, 80, 123 or 157 may be relatively low in nitrogen oxides content, and these streams may be directly discharged to the atmosphere, or passed to a catalytic combustor for oxidation of residual nitrogen oxides prior to discharge to atmosphere, so as to prevent air pollution. Similarly, the final tail gas streams 43, 82, 125 or 159 may be passed to a catalytic combustor for oxidation of residual nitrogen oxides with air, prior to discharge to atmosphere. A process of this nature is described in U.S. patent application No. 409,507 filed Nov. 6, 1964 now issued as U.S. Pat. No. 3,467,492, and an apparatus for carrying out the catalytic combustion reaction is described in U.S. Patent application No. 555,108 filed June 3, 1966, now issued as U.S. Pat. No. 3,443,910.

Example of industrial application of the process of the present invention will now be described.

EXAMPLE I

The process of the present invention was applied to the design of a 250 tons/day nitric acid plant, which produced nitric acid at 60% and 75% acid strengths. The magnitudes of flow rates will be expressed in terms of 100% nitric acid content, thus the plant produced 15 tons/day of 75% acid which is equivalent to an actual mass output of 20 tons/day of acid solution. Following are the flow rates, compositions as mol or weight percent, and operating variables for principal process streams, with reference to the process of FIG. 1.

COMPOSITION, MOL OR WEIGHT PERCENT

| Stream No. | Mass flow rate, tons per day of 100% acid content | Measure of percent | Nitric acid | Nitrogen | Nitrogen oxides | Oxygen | Water | Temp., °C. | Pressure kg./sq. cm. |
|---|---|---|---|---|---|---|---|---|---|
| 14 | | Mol percent | | 87.80 | 8.40 | 2.57 | 1.23 | 60 | 7.74 |
| 16 [1] | | do | | 87.80 | 8.40 | 2.57 | 1.23 | 60 | 7.74 |
| 18 | | do | | 87.80 | 8.40 | 2.57 | 1.23 | 30 | 7.74 |
| 20 | | do | | 87.80 | 8.40 | 2.57 | 1.23 | −10 | 7.74 |
| 22 | | do | | 94.15 | 4.37 | 1.48 | | −10 | 7.74 |
| 23 | | Weight percent | 65.7 | | 34.3 | | | −10 | 7.74 |
| 31 | 15 | do | 75 | | | | 25 | | |
| 37 | 8.2 | do | 60 | | | | 40 | | |
| 41 | | Mol percent | | 85.8 | 5.0 | 9.2 | | | |
| 46 | 235 | Weight percent | 60 | | | | 40 | | |

[1] Stream 16 was 7.8 mol percent of stream 14.

EXAMPLE II

The process of the present invention as exemplified by FIG. 4 was applied to the design of a 250 tons/day nitric acid plant, which produced 40% of total nitric acid output as 99% acid by distillation, and the balance of acid output as 60% acid. The magnitudes of flow rates will be expressed in terms of 100% nitric acid content, thus the plant produced 150 tons/day of 60% acid which is equivalent to an actual mass output of 250 tons/day of acid solution. Following are the flow rates, compositions as mol or weight percent and operating variables for principal process streams, with reference to the process of FIG. 4.

COMPOSITION, MOL OR WEIGHT PERCENT

| Stream No. | Mass flow rate, tons per day of 100% acid content | Measure of percent | Nitric acid | Nitrogen | Nitrogen oxides | Oxygen | Water | Temp., °C. | Pressure kg./sq. cm. |
|---|---|---|---|---|---|---|---|---|---|
| 132 [1] | | Mol percent | | 87.80 | 8.40 | 2.57 | 1.23 | 60 | 7.74 |
| 134 | | do | | 87.80 | 8.40 | 2.57 | 1.23 | 30 | 7.74 |
| 136 | | do | | 87.80 | 8.40 | 2.57 | 1.23 | −10 | 7.74 |
| 138 | | do | | 94.15 | 4.37 | 1.48 | | −10 | 7.74 |
| 139 | 50.8 | Weight percent | 65.7 | | 34.3 | | | −10 | 7.74 |
| 147 | 208.7 | do | 80 | | | | 20 | | [2] |
| 145 | 10.5 | do | 60 | | | | 40 | | |
| 143 | 108.7 | do | 68 | | | | 32 | | [2] |
| 152 | 100 | do | 99 | | | | 1 | | [2] |
| 157 [3] | | Mol percent | | 90.82 | 3.07 | 6.11 | | | |
| 162 | 150 | Weight percent | 60 | | | | 40 | | |

[1] Stream 131 was omitted, all of stream 130 processed via stream 132.
[2] Atmosphere.
[3] Flow rate 137.0 mols/hour.

We claim:

1. A process for the production of concentrated nitric acid which comprises dividing a feed process gas stream containing nitrogen oxides and water vapor into a first portion and a second portion, cooling said first portion of said feed process gas stream containing nitrogen oxides and water vapor to a sub-ambient temperature in the range of about −40° C. to 15° C. at a pressure in the range of 2 kg./sq. cm. to 10 kg./sq. cm., whereby a liquid condensate containing nitric acid and nitrogen oxides is formed, separating said condensate from the residual uncondensed gas stream, absorbing the nitrogen oxides content of said residual gas stream and said second portion of said feed process gas stream in an aqueous solution by flowing said aqueous solution through a first absorption zone and in contact with said residual gas stream and said second portion of said feed process gas stream, whereby aqueous nitric acid solution containing in the range of about 50% to 65% nitric acid content is formed, passing a first air stream into said first absorption zone, whereby nitrogen oxides are stripped from said aqueous nitric acid solution and nitric oxide is oxidized to nitrogen dioxide which is absorbed in said first absorption zone, removing a first overhead tail gas stream from the top of said first absorption zone, dispersing said aqueous nitric acid solution into the upper section of a second absorption zone, passing said condensate into the middle section of said second absorption zone, dispersing a second air stream into the lower section of said second absorption zone, whereby said second air stream flows upwards through said second absorption zone and thereby bleaches the concentrated nitric acid in the lower section of said second zone, strips nitrogen oxides from the liquid phase in the middle section of said second zone, and oxidizes nitric oxide to nitrogen dioxide which is absorbed in the upper section of said second zone, removing a second overhead tail gas stream from the top of said second zone, and removing a product concentrated nitric acid solution containing in the range of about 70% to 99% nitric acid content from the bottom of said second absorption zone.

2. The process of claim 1, in which said process gas stream is produced by the combustion of ammonia vapor with air, and the initial hot combustion effluent gas stream is cooled to condense dilute aqueous nitric acid solution, said dilute nitric acid solution being separated from the process gas stream and passed to said first absorption zone.

3. The process of claim 1, in which said aqueous nitric acid solution removed from said first absorption zone and containing in the range of about 50% to 65% nitric acid content is divided into a first portion and a second portion, said first portion being passed into the upper section of said second absorption zone, said second portion being withdrawn as a product stream.

4. The process of claim 1, in which said second overhead tail gas stream from said second absorption zone is passed to said first absorption zone, whereby residual nitrogen oxides content in said second overhead tail gas stream is recovered in said first zone as nitric acid.

5. A process for the production of concentrated nitric acid which comprises dividing a feed process gas stream containing nitrogen oxides and water vapor into a first portion and a second portion, cooling said first portion of said feed process gas stream containing nitrogen oxides and water vapor to a sub-ambient temperature in the range of about −40° C. to 15° C. at a pressure in the range of 2 kg./sq. cm. to 10 kg./sq. cm., whereby a liquid condensate containing nitric acid and nitrogen oxides is formed, separating said condensate from the residual uncondensed gas stream, absolving the nitrogen oxides content of said residual gas stream and said second portion of said feed process gas stream in an aqueous solution by flowing said aqueous solution through a first absorption zone and in contact with said residual gas stream and said second portion of said feed process gas stream, whereby aqueous nitric acid solution containing in the range of about 50% to 65% nitric acid content is formed, passing a first air stream into said first absorption zone, whereby nitrogen oxides are stripped from said aqueous nitric acid solution and nitric oxide is oxidized to nitrogen dioxide which is absorbed in said first absorption zone, removing a first overhead tail gas stream from the top of said first absorption zone, dispersing said aqueous nitric acid solution into the upper section of a second absorption zone for gas-liquid contact, absorption of nitrogen oxides into the liquid phase and formation of nitric acid in the liquid phase, dispersing said condensate into the upper section of a stripping zone for gas-liquid contact and removal of nitrogen oxides from the liquid condensate phase, passing the bottoms highly concentrated liquid nitric acid streams from said second absorption zone and from said stripping zone into the upper section of a bleaching zone for gas-liquid contact and removal of residual nitrogen oxides, dispersing a second air stream into the lower section of said bleaching zone, whereby said second air stream rises through said bleaching zone and removes residual nitrogen oxides from said highly concentrated liquid nitric acid streams, removing the resulting gas phase containing nitrogen oxides in low concentration from the top of said bleaching zone, dispersing said resulting gas phase into the lower section of said stripping zone, whereby said resulting gas phase rises through said stripping zone and removes nitrogen oxides from said condensate, removing the resulting enriched gas phase containing nitrogen oxides in high concentration from the top of said stripping zone, dispersing said resulting enriched gas phase into the lower section of said second absorption zone, removing a second overhead tail gas stream from the top of said second zone, and removing a product concentrated nitric acid solution containing in the range of about 70% to 99% nitric acid content from the bottom of said bleaching zone.

6. The process of claim 5, in which said process gas stream is produced by the combustion of ammonia vapor with air, and the initial hot combustion effluent gas stream is cooled to condense dilute aqueous nitric acid solution, said dilute nitric acid solution being separated from the process gas stream and passed to said first absorption zone.

7. The process of claim 5, in which said aqueous nitric acid solution removed from said first absorption zone and containing in the range of about 50% to 65% nitric acid content is divided into a first portion and a second portion, said first portion being passed into the upper section of said second absorption zone, said second portion being withdrawn as a product stream.

8. The process of claim 5, in which said second overhead tail gas stream from said second absorption zone is passed to said first absorption zone, whereby residual nitrogen oxides content in said second overhead tail gas stream is recovered in said first zone as nitric acid.

9. In a process for the production of nitric acid in which ammonia vapor is reacted with air at elevated temperature to produce a hot combustion effluent gas stream principally containing nitrogen oxides, water vapor and nitrogen, the hot combustion effluent gas stream is cooled to condense dilute aqueous nitric acid solution, said dilute nitric acid solution is separated from the residual process gas stream, said residual process gas stream principally containing nitrogen, nitrogen oxides, oxygen and water vapor, said residual process gas stream is passed into a first absorption zone, the nitrogen oxides content of said residual process gas stream is absorbed in an aqueous solution in said first absorption zone to form aqueous nitric acid solution containing in the range of about 50% to 65% nitric acid content, by flowing said aqueous solution through said first absorption zone and in contact with said residual gas stream, and by passing a first air stream into said first absorption zone to strip nitrogen oxides from said aqueous nitric acid solution and oxidize nitric oxide in said first absorption zone, said aqueous nitric acid solution is withdrawn from said first absorption zone as a product stream, and a tail gas stream substantially free of nitrogen oxides is discharged from said first absorption zone, the improved process for producing highly concentrated nitric acid having a nitric acid content greater than 68% which comprises:

(a) dividing said residual process gas stream into a first portion and a second portion,
(b) passing said second portion of said residual process gas stream into said first absorption zone,
(c) cooling said first portion of said residual process gas stream to a sub-ambient temperature in the range of about −40° C. to 15° C. at a pressure in the range of 2 kg./sq. cm. to 10 kg./sq. cm., whereby a liquid condensate containing nitric acid and nitrogen oxides is formed,
(d) separating said condensate from the residual uncondensed gas stream,
(e) passing said residual uncondensed gas stream into said first absorption zone, whereby the nitrogen oxides content of said residual uncondensed gas stream is absorbed in said aqueous solution and said aqueous nitric acid solution containing in the range of about 50% to 65% nitric acid content is formed,
(f) dispersing at least a portion of said aqueous nitric acid solution containing in the range of about 50% to 65% nitric acid content into the upper section of a second absorption zone,
(g) passing said condensate produced by step (c) into the middle section of said second absorption zone,
(h) dispersing a second air stream into the lower section of said second absorption zone, whereby said second air stream flows upwards through said second absorption zone and thereby bleaches the concentrated nitric acid in the lower section of said second zone, strips nitrogen oxides from the liquid phase in the middle section of said second zone, and oxidizes nitric oxide in the upper section of said second zone,
(i) removing an overhead tail gas stream from the top of said second zone, and
(j) removing a product concentrated nitric acid solution containing in the range of about 70% to 99% nitric acid content from the bottom of said second absorption zone.

10. The process of claim 9, in which said condensed dilute aqueous nitric acid solution is passed into said first absorption zone.

11. The process of claim 9, in which said overhead tail gas stream removed by step (i) from the top of said second absorption zone is passed to said first absorption zone, whereby residual nitrogen oxides content in said overhead tail has stream is recovered in said first zone as nitric acid.

References Cited

UNITED STATES PATENTS

| | | | |
|---|---|---|---|
| 1,050,160 | 1/1913 | Von Berneck et al. | 23—160 |
| 1,948,968 | 2/1934 | Kramer et al. | 23—160 X |
| 2,046,162 | 6/1936 | Handforth et al. | 23—160 |

FOREIGN PATENTS

| | | |
|---|---|---|
| 405,450 | 2/1934 | Great Britain. |
| 910,131 | 11/1962 | Great Britain. |

OSCAR R. VERTIZ, Primary Examiner

G. O. PETERS, Assistant Examiner

U.S. Cl. X.R.

23—162